(12) United States Patent
Wang et al.

(10) Patent No.: US 11,587,291 B2
(45) Date of Patent: Feb. 21, 2023

(54) SYSTEMS AND METHODS OF CONTRASTIVE POINT COMPLETION WITH FINE-TO-COARSE REFINEMENT

(71) Applicant: TENCENT AMERICA LLC, Palo Alto, CA (US)

(72) Inventors: Bo Wang, Palo Alto (CA); Weikai Chen, Palo Alto (CA); Bo Yang, Palo Alto (CA); Songrun Liu, Palo Alto (CA)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/364,586

(22) Filed: Jun. 30, 2021

(65) Prior Publication Data
US 2023/0019972 A1 Jan. 19, 2023

(51) Int. Cl.
| | |
|---|---|
| *G06T 17/20* | (2006.01) |
| *G06T 19/20* | (2011.01) |
| *G06T 3/40* | (2006.01) |
| *G06T 5/00* | (2006.01) |
| *G06N 3/08* | (2006.01) |
| *G06N 3/04* | (2006.01) |
| *G06N 20/20* | (2019.01) |
| *G06V 10/75* | (2022.01) |
| *G06K 9/62* | (2022.01) |

(52) U.S. Cl.
CPC ............ *G06T 17/205* (2013.01); *G06K 9/623* (2013.01); *G06N 3/0454* (2013.01); *G06N 3/08* (2013.01); *G06N 20/20* (2019.01); *G06T 3/40* (2013.01); *G06T 5/002* (2013.01); *G06T 19/20* (2013.01); *G06V 10/751* (2022.01); *G06T 2219/2016* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 2018/0276793 A1* | 9/2018 | Kwon | ............... G06T 7/579 |
| 2019/0373293 A1 | 12/2019 | Bortman et al. | |
| 2020/0387782 A1* | 12/2020 | Hegde | ............. G06N 3/0454 |

(Continued)

OTHER PUBLICATIONS

Wang et al., "Point cloud completion by learning shape priors," 2020 IEEE/RSJ International Conference on Intelligent Robots and Systems (IROS), pp. 10719-10726 (Year: 2020).*

(Continued)

*Primary Examiner* — Anh-Tuan V Nguyen
(74) *Attorney, Agent, or Firm* — Morgan, Lewis & Bockius LLP

(57) ABSTRACT

An electronic apparatus performs a method of recovering a complete and dense point cloud from a partial point cloud. The method includes: constructing a sparse but complete point cloud from the partial point cloud through a contrastive teacher-student neural network; and transforming the sparse but complete point cloud to the complete and dense point cloud. In some embodiments, the contrastive teacher-student neural network has a dual network structure comprising a teacher network and a student network both sharing the same architecture. The teacher network is a point cloud self-reconstruction network, and the student network is a point cloud completion network.

20 Claims, 7 Drawing Sheets

(56) References Cited

U.S. PATENT DOCUMENTS

| | | | |
|---|---|---|---|
| 2020/0402246 A1* | 12/2020 | Hekmatian | G01S 17/89 |
| 2021/0005013 A1* | 1/2021 | Mitchell | G06T 17/00 |
| 2022/0005212 A1* | 1/2022 | Nagano | G06V 10/40 |
| 2022/0222891 A1* | 7/2022 | Lu | G06T 17/00 |
| 2022/0245841 A1* | 8/2022 | Lopez Rodriguez | G06T 7/50 |
| 2022/0335685 A1* | 10/2022 | Cai | G06T 17/00 |

OTHER PUBLICATIONS

Yulan Guo et al., "Deep Learning for 3D Point Clouds: A Survey", IEEE Transactions on Pattern Analysis and Machine Intelligence, Jun. 23, 2020, 27 pgs., Retrieved from the Internet: https://arxiv.org/pdf/1912.12033.pdf.

Le Hui et al., "Efficient 3D Point Cloud Feature Learning for Large-Scale Place Recognition", Journal of Latex Class Files, vol. 14, No. 8, Jan. 7, 2021, 13 pgs., Retrieved from the Internet: https://arxiv.org/pdf/2101.02374.pdf.

Tencent Technology, ISRWO, PCT/US2022/018281, Jun. 9, 2022, 13 pgs.

\* cited by examiner

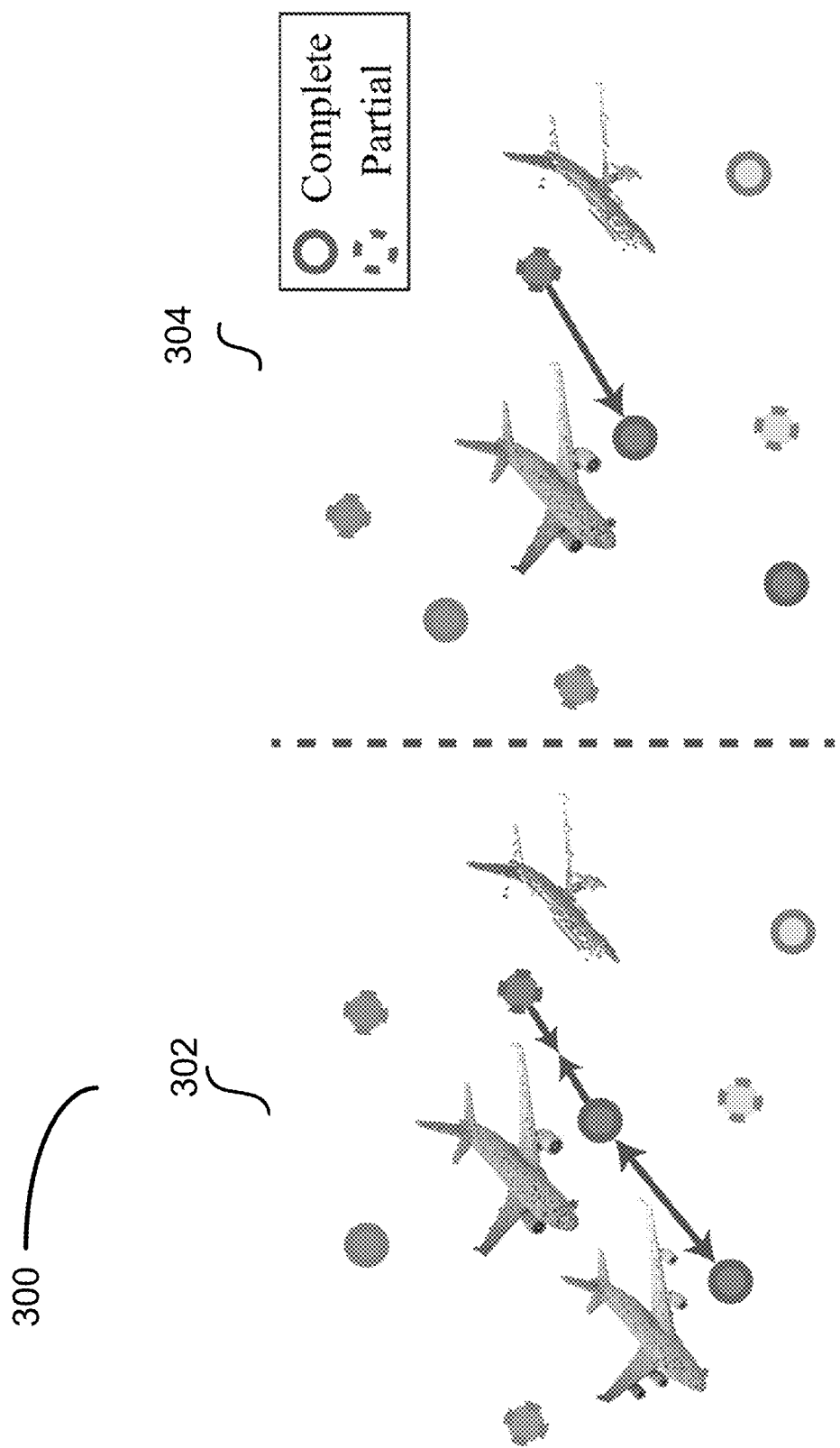

400 constructing a sparse but complete point cloud from the partial point cloud through a contrastive teacher-student neural network 402 training the student network from ground-truth data and features learned from the teacher network so that a first feature representation of the partial point cloud of the student network is close to a second feature representation of a complete sparse point cloud of the teacher network 404 transforming the sparse but complete point cloud to the complete and dense point cloud 406 applying symmetry detection and enrichment based on the sparse but complete point cloud to get a symmetrical point cloud from the partial point cloud 408 refining shape of the sparse but complete point cloud to get a refined sparse but complete point cloud 410 iteratively up-sampling the refined sparse but complete point cloud to get an initial complete and dense point cloud 412

FIG. 4

SYSTEMS AND METHODS OF CONTRASTIVE POINT COMPLETION WITH FINE-TO-COARSE REFINEMENT

TECHNICAL FIELD

The present disclosure relates generally to image technologies, and in particular, to image processing and three-dimensional (3D) point cloud completion methods and systems.

BACKGROUND

A partial raw point cloud is usually incomplete, sparse and noisy due to occlusion and limitations of the acquisition sensors. Therefore, 3D point cloud completion becomes a critical step for the success of point cloud data to be used in real-word applications. The challenge of tackling this problem comes from recovering an accurate complete shape with geometry details, and producing a point cloud with high density.

Current point cloud completion methods either produce a dense complete but over smooth point cloud lacking details, or produce a low resolution sparse point cloud.

Some global shape representation based point cloud completion methods learn a global shape representation by shared multilayer perceptron (MLP) to directly regress 3D coordinates of reconstructed points in an end-to-end manner, which usually lead to the generated point cloud being over smooth and with missing details.

Some low-resolution point cloud completion methods generate low-resolution but not dense complete point cloud due to the large memory consumption limitation. Similarly, voxel or implicit field representation based shape completion methods have resolution and memory limitations as well due to 3D convolution.

SUMMARY

The goal of point cloud completion is to recover a complete and dense point cloud from a raw partial point cloud. To overcome the drawbacks described above, the three-dimensional (3D) point cloud completion methods and systems are disclosed herein which include contrastive teacher-student network for sparse but complete point cloud recovering, symmetry detection, shape refinement, de-noising and iterative up-sampling, which together produce a complete and dense point cloud with details.

According to a first aspect of the present application, a method of recovering a complete and dense point cloud from a partial point cloud, includes: constructing a sparse but complete point cloud from the partial point cloud through a contrastive teacher-student neural network; and transforming the sparse but complete point cloud to the complete and dense point cloud.

In some embodiments, the partial point cloud is obtained from a raw scanning.

In some embodiments, the contrastive teacher-student neural network has a dual network structure comprising a teacher network and a student network both sharing the same architecture. In some embodiments, the teacher network is a point cloud self-reconstruction network that takes a ground-truth complete sparse point cloud as input, and the student network is a point cloud completion network that takes the partial point cloud as input.

In some embodiments, constructing the sparse but complete point cloud from the partial point cloud through the contrastive teacher-student neural network includes: training the student network from the ground-truth data and features learned from the teacher network so that a first feature representation of the partial point cloud of the student network is close to a second feature representation of the complete sparse point cloud of the teacher network. In some embodiments, the teacher network and the student network are trained jointly.

In some embodiments, the difference between the first feature representation of the partial point cloud of the student network and the second feature representation of the complete sparse point cloud of the teacher network is minimized after the training.

In some embodiments, transforming the sparse but complete point cloud to the complete and dense point cloud includes: applying symmetry detection and enrichment based on the sparse but complete point cloud to get a symmetrical point cloud from the partial point cloud; refining the shape of the sparse but complete point cloud to get a refined sparse but complete point cloud; and iteratively up-sampling the refined sparse but complete point cloud to get an initial complete and dense point cloud.

According to a second aspect of the present application, an electronic apparatus includes one or more processing units, memory and a plurality of programs stored in the memory. The programs, when executed by the one or more processing units, cause the electronic apparatus to perform the one or more methods as described above.

According to a third aspect of the present application, a non-transitory computer readable storage medium stores a plurality of programs for execution by an electronic apparatus having one or more processing units. The programs, when executed by the one or more processing units, cause the electronic apparatus to perform the one or more methods as described above.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIG. 3 depicts the difference between contrastive learning and the implemented teacher-student network in accordance with some embodiments of the present disclosure.

FIG. 4 is a block diagram illustrating an exemplary process of recovering a complete and dense point cloud from a partial point cloud in accordance with some implementations of the present disclosure.

Figure 1A:
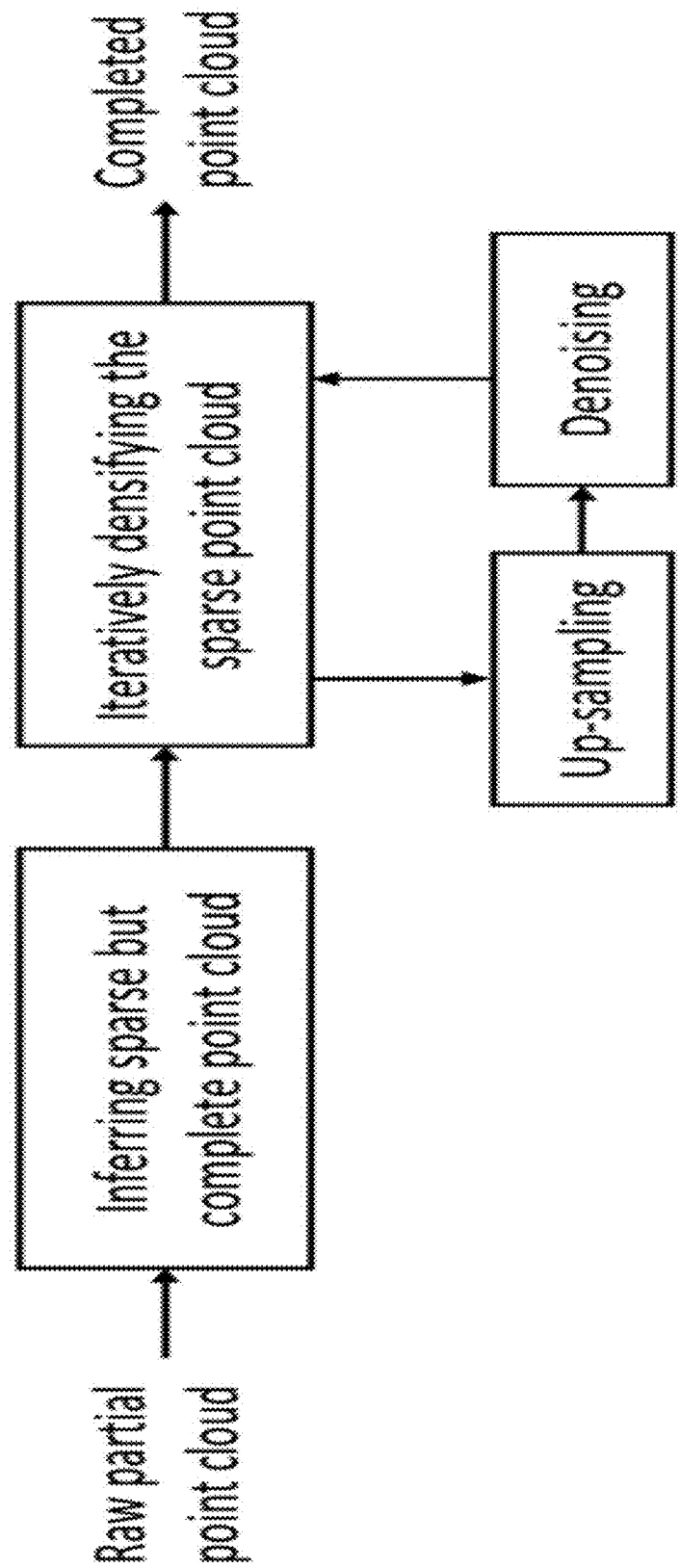
FIG. 1A is a diagram illustrating an exemplary overall process of point cloud completion in accordance with some implementations of the present disclosure.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices.

Before the embodiments of the present application are further described in detail, names and terms involved in the embodiments of the present application are described, and the names and terms involved in the embodiments of the present application have the following explanations.

Point cloud: a set of data points in space that represents a 3D shape or object, that is generally produced by 3D scanners or by photogrammetry software, which measure many points on the external surfaces of objects around them.

Teacher-student network: a dual network structure and learning strategy where one network can share soft labels or learned features to the other.

PointNet: A type of neural network that directly consumes point clouds and respects the permutation invariance of points from the input.

Stacked-PointNet: a hierarchical PointNet with stacked network architecture.

MLP: multilayer perceptron that is a class of feedforward artificial neural network (ANN) including at least three layers of nodes: an input layer, a hidden layer and an output layer.

ReLU activation: Rectified Linear Unit activation that is an activation function defined as the positive part of its argument.

ShapeNet: a richly-annotated, large-scale dataset of 3D models.

GRNet: Gridding Residual Network for point cloud completion that includes two novel differentiable layers, named Gridding and Gridding Reverse, to convert between point clouds and 3D grids without losing structural information.

MSN: Morphing and Sampling Network that predicts a complete but coarse-grained point cloud with parametric surface elements and merges the coarse-grained prediction with the input point cloud by a sampling algorithm.

PCN: Point Completion Network that is a learning-based approach for shape completion, and directly operates on raw point clouds without any structural assumption or annotation about the underlying shape.

Convolutional neural network (CNN): a class of deep neural networks, most commonly applied to analyzing visual imagery.

DGCNN: Dynamic Graph CNN, in which convolutional filters are designed to adapt to dynamic structures of local regions inside graphs.

PointNet++: a deep learning method on point sets that has learning layers to adaptively combine features from multiple scales and a hierarchical neural network that applies a nested partitioning of the input point set.

In some embodiments, complete and dense point cloud is recovered from raw partial point cloud data. Complete means the recovery of details, and dense indicates a high density of the produced points. Two sub-steps or stages are used to tackle the problem of complete and dense point cloud recovery. The first stage is to infer a sparse but complete point cloud to recover the overall shape. And the second stage is to infer a complete and dense point cloud based on the output of the first stage, while preserving the input partial point cloud structure. It is critical to generate a sparse but complete point cloud, as a good initialization makes the second stage (i.e., densifying point cloud) easier. A novel contrastive learning strategy is implemented to get a high-quality initial point cloud. In the second stage, the aim is to densify the complete and sparse point cloud. Since the input partial data contains the most trust-worthy information and should not be degraded during the completion/up-sampling process, the complete but sparse point cloud and the input point cloud are first integrated to get a mixed point cloud which preserves the input information. Then iterative up-sampling and de-noising are performed to refine the mixed point cloud.

FIG. 1A is a diagram illustrating an exemplary overall process of point cloud completion in accordance with some implementations of the present disclosure.

Figure 1B:
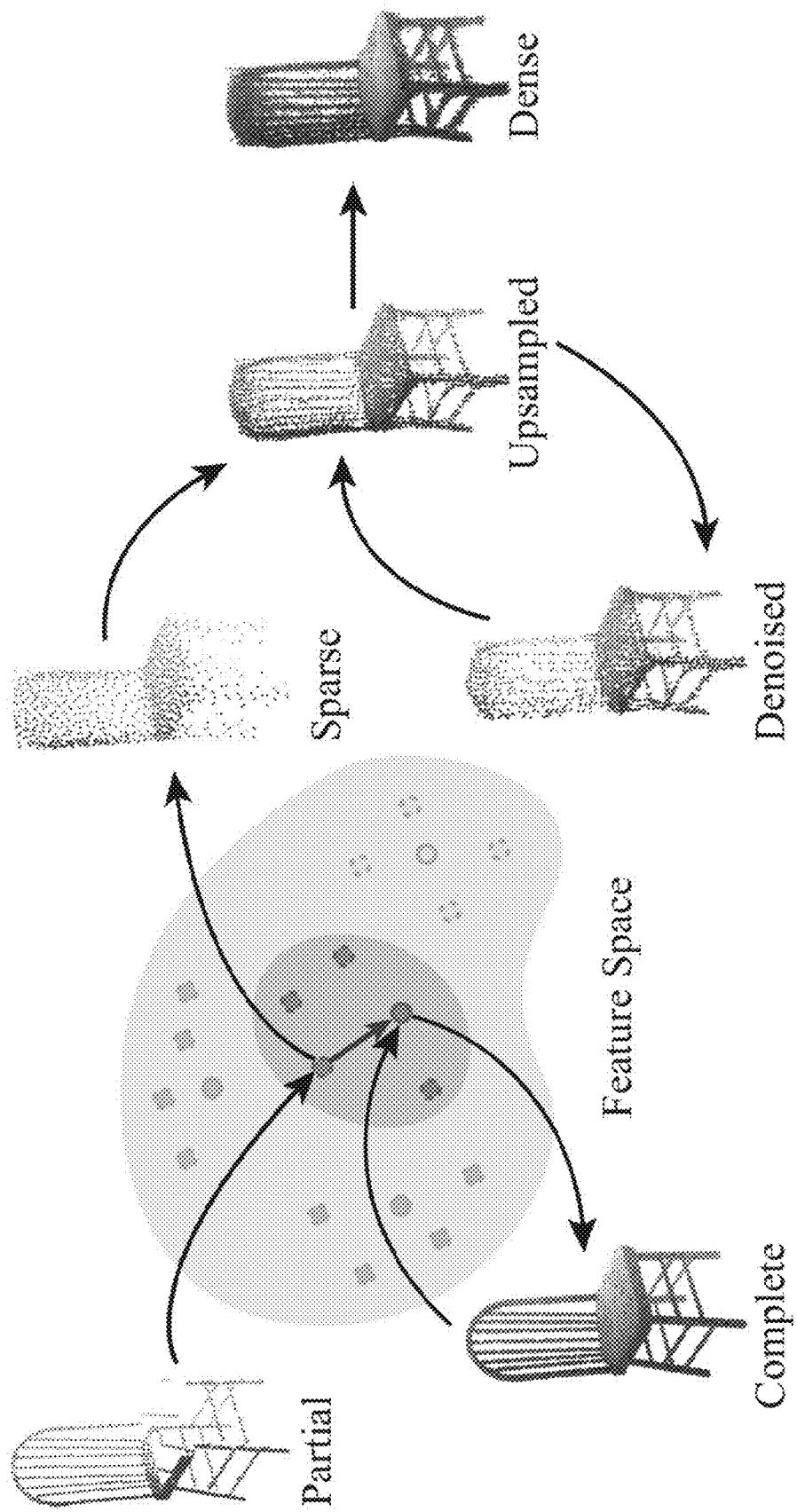
FIG. 1B is a diagram with image examples illustrating an overall process of point cloud completion in accordance with some implementations of the present disclosure.

FIG. 1B is a diagram with image examples illustrating an overall process of point cloud completion in accordance with some implementations of the present disclosure.

In some embodiments, a sparse but complete point cloud is first inferred from the input partial data, by enforcing the representation of the input close to that of its complete counterpart in the latent feature space via a teacher-student network. Secondly, the output of the first stage is densified using an iterative optimization mechanism that performs up-sampling and de-noising alternatively.

In some embodiments, complete and dense point cloud is recovered from raw partial point cloud data. Complete means the recovery of details, and dense indicates a high density of the produced points. As depicted in FIGS. 1A and 1B, the first stage of recovering complete and dense point cloud is to infer a sparse but complete point cloud to recover the overall shape, and the second stage is to infer a complete and dense point cloud based on the output of the first stage, while preserving the input partial point cloud structure.

For the first stage, it is critical to generate a high-quality sparse but complete point cloud, as a good initialization that makes the second stage (i.e., densifying point cloud) easier. In some embodiments, a novel teacher-student network is implemented to align latent representations inspired by contrastive learning. A novel teacher-student style network is designed to realize the latent representation learning strategy. In particular, an auto-encoder for sparse point cloud self-reconstruction as a teacher network, and another auto-encoder for sparse point cloud completion as a student network are jointly trained. The embedding of the student network encoder is forced to match that of the teacher network because self-reconstruction is an easier task compared to the point cloud completion. By enforcing the latent representation of the completion student network to match that of the self-reconstruction teacher network during training both networks, the student network that learns to perform sparse point cloud completion is able to generate improved completion result. In this way, the self-reconstruction network plays a teacher role and the completion auto-encoder plays a student role. Therefore, with the help from the teacher network, high-fidelity sparse but complete point cloud is generated by the student network in the first stage.

In some embodiments, the second stage of the implemented framework is achieved by iterative up-sampling and de-noising. Before the iterative refinement, the complementary and trustworthy information from input partial point cloud, and its symmetrical part obtained from a symmetry-detection module are integrated, to the obtained sparse but complete point cloud. After that, a few iterations of up-sampling and de-noising are performed to generate a dense and complete point cloud. Specifically, at each iteration, firstly the output of previous step is taken as input. The output is then up-sampled to a denser point cloud. A de-nosing step is followed, producing a cleaner and denser point cloud, which will be fed into the next iteration. Finally, a final dense and complete point cloud is obtained after applying an input preservation step to enhance its quality.

In some embodiments, in the process and system disclosed herein, the latent representation of partial point cloud close to that of the complete point cloud is enforced to obtain high-fidelity sparse but complete point cloud. The original information is preserved with the help of symmetry detection and filtered to make use of the trustworthy information from input. Iterative up-sampling and de-noising strategy are used to re-fine and densify the intermediate result and keep fine-grained features and detailed geometry.

Figure 2:
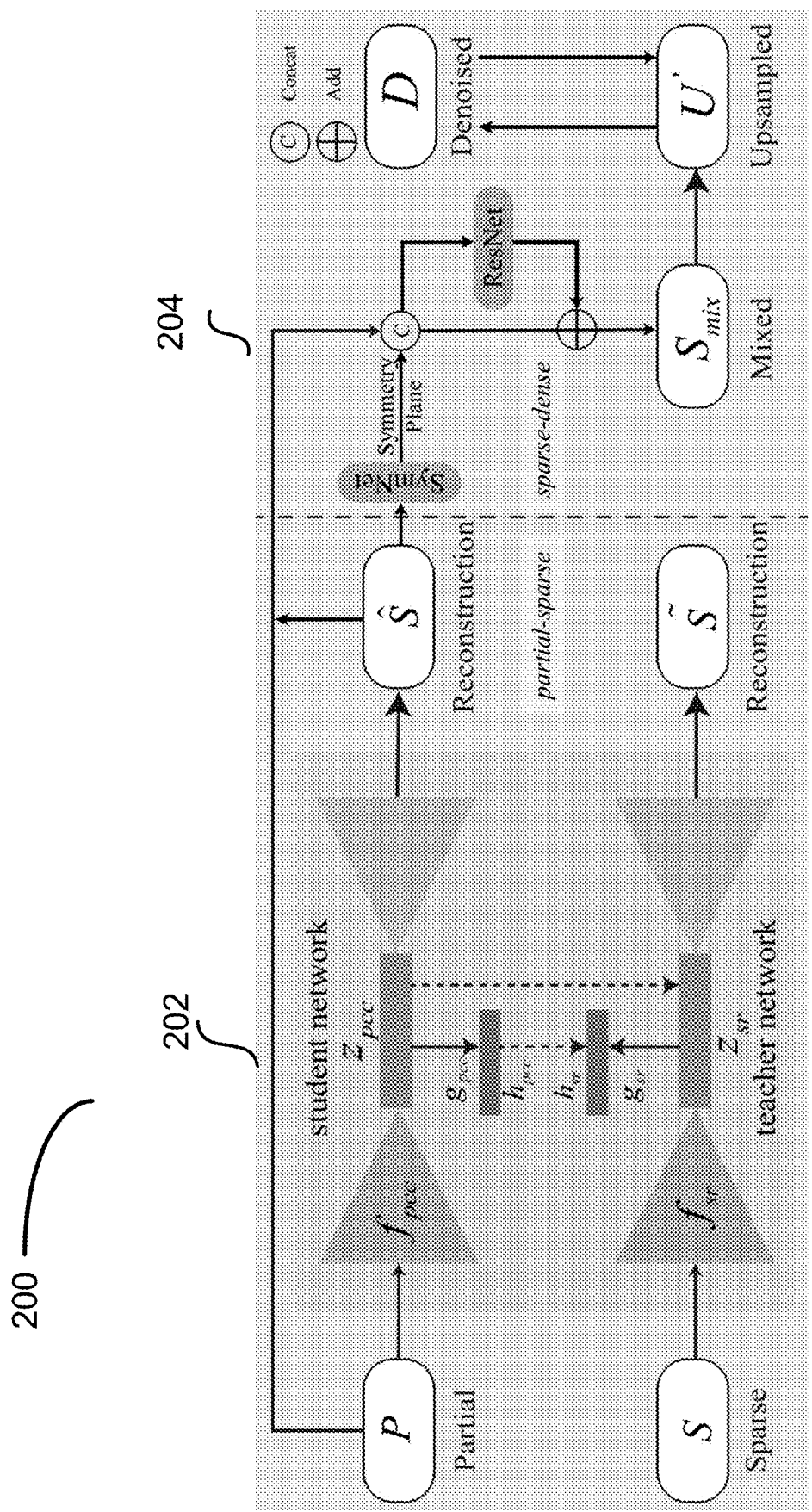
FIG. 2 is diagram illustrating a detailed exemplary process of point cloud completion in accordance with some implementations of the present disclosure.

FIG. 2 is diagram illustrating a detailed exemplary process 200 of point cloud completion in accordance with some implementations of the present disclosure. Two major components are included in the process of 200: contrastive teacher-student network block 202 for inferring sparse but complete point cloud on the left, and iteratively refining and up-sampling block 204 on the right.

As shown in FIG. 2, the framework is composed of two stages. The first stage performs sparse shape recovery and produces a completed sparse point cloud. The second stage conducts further symmetrization and refinement, followed by iterative up-sampling for a few iterations to obtain a dense and complete point cloud.

In some embodiments, a teacher-student network is a dual network structure and learning strategy where one network can share soft labels or learned features to the other. The improved contrastive teacher-student network block 202 is shown in FIG. 2. The representation of partial point cloud P close to that of the complete point cloud is enforced via contrastive learning to obtain high-fidelity sparse but complete point cloud Ŝ. Both $f_{pcc}$ and $f_{sr}$ are encoders that share the same network architecture of PointNet but different weights. The encoders are used to extract global features of P and its corresponding sparse and complete point cloud S, producing $z_{pcc}$ and $z_{sr}$ respectively. Two multilayer perceptron (MLP) g_pcc and $g_{sr}$ are used to project $z_{pcc}$ and $z_{sr}$ to $h_{pcc}$ and $h_{sr}$. The total loss consists of 2 parts including geometric loss and feature alignment loss. Geometric loss is chamfer distance on Ŝ and S̃. Feature alignment loss is L2 norm loss applied on zs and hs, while hs are normalized but zs are not.

In some embodiments, a Teacher-Student Network is implemented as shown in FIG. 2. Rather than simply encoding and decoding sparse point cloud from a single feature vector learned from input partial point cloud, a teacher-student network is used where a student network deals with a difficult task (partial to complete) is helped with a teacher network that tackles an easier one (sparse point cloud self-reconstruction). In this way, the approach allows the latent representation of the completion student network to match that of a self-reconstruction teacher network, leading to the student network produce improved completion result. As shown in the left part 202 of FIG. 2, given an incomplete partial point cloud P as input, the goal in the first stage is to get a complete but sparse point cloud Ŝ, where the overall shape is completed and details are preserved as much as possible.

FIG. 3 depicts the difference between contrastive learning (left 302) and the implemented teacher-student network (right 304) in accordance with some embodiments of the present disclosure. Each dot represents a partial or complete shape in latent space, and the dots with same color indicate they belong to the same shape. The method and system disclosed herein is different from the recent contrastive learning approaches. Contrastive learning aims to learn representation that reduces the distance between representations of augmented views of the same object, while increases the distance between representations of the augmented views of different objects between positive and negative samples. However, only encoder (i.e., feature extractor) is trained by these methods to produce similar representations for the augmentations of an object, which is not suitable for shape completion task where an easy self-reconstruction task is needed to help the difficult completion problem.

In particular, the latent representation of the completion student network matches that of the self-reconstruction teacher network so that the difficult completion task is helped by the easier self-reconstruction one. However, contrastive learning can only enforce the representations of both networks close to each other, and the resulting learned representation (i.e. averaging between the two networks) does not fully serve the purpose of using one network to help the other as illustrated in FIG. 3. Existing contrastive learning methods only optimize encoder, so they are not applicable to self-reconstruction task where both encoder and decoder need to be trained together.

In some embodiments, to solve the sparse point cloud completion problem, the feature extraction encoders and point cloud generation decoders are jointly trained in both teacher and student networks, encouraging the latent representation of the partial point cloud close to that of its corresponding complete sparse point cloud, and simultaneously ensuring the decoders both in teacher and student networks to produce good sparse reconstruction against the ground-truth. In this way, the latent representation learned by the student network that takes a partial point cloud as input is not only close to that of the teacher network which takes complete sparse point cloud as input, but also can be used by its decoder to better recover a complete sparse point cloud.

Specifically, the teacher network is a point cloud self-reconstruction network denoted as SR-Net that takes the ground-truth sparse point cloud S with size $N_s$ as input, and the student network is a point cloud completion network named PCC-Net that takes a partial point cloud P as input. The two networks share the same architecture, but different weights, and they are trained jointly. PCC-Net is expected to learn from the teacher network SR-Net so that the feature representation of a partial point cloud is close to that of its corresponding sparse point cloud. The encoders of SR-Net and PCC-Net are denoted as $f_{sr}$ and $f_{pcc}$, both are stacked-PointNet, producing the representations $z_{sr}=f_{sr}(S)$ and $z_{pcc}=f_{pcc}(P)$, and from which the reconstructed point clouds $\tilde{S}$ and $\hat{S}$ will be decoded respectively, both decoders of SR-Net and FCC-Net use the same of 3-layer-MLP architecture but with different weights. In some embodiments, projection heads $g_{sr}$ and $g_{pcc}$ are used to project $z_{sr}$ and $z_{pcc}$ as $h_{sr}=g_{sr}(z_{sr})$ and $h_{pcc}=g_{pcc}(z_{pcc})$) The two projection heads are of the same structure, including 2 consecutive fully connected layers with ReLU activation after the first layer. The contrastive loss, $L_{contrast}$, that enforces the representations of the partial point cloud, $z_{pcc}$ and $h_{pcc}$, to be close with that of the sparse point cloud, $z_{sr}$ and $h_{sr}$, is defined as follows:

$$\mathcal{L}_{contrast} = \|z_{pcc} - z_{sr}\|_2^2 + \left\|\left(\frac{h_{pcc}}{\|h_{pcc}\|} - \frac{h_{sr}}{\|h_{sr}\|}\right)\right\|_2^2 \quad (1)$$

and the reconstruction losses for SR-Net and PCC-Net are formulated as:

$$L_{sr}=CD(\tilde{S},S)$$

$$L_{pcc}=CD(\hat{S},S) \quad (2)$$

where CD is bi-directional chamfer distance.

In some embodiments, in the teacher-student network training process, the contrastive loss $L_{contrast}$ is minimized to encourage the representation from partial point cloud close to that of their corresponding sparse complete point cloud. Intuitively, $z_{pcc}$ and $z_{sr}$ would easily collapse if only $f_{pcc}$ and $f_{sr}$ are optimized to make their representations close enough. Therefore, additional reconstruction loss $L_{sr}$ and $L_{pcc}$ are used to prevent collapsing. The overall objective function is:

$$L_{p2s}=L_{sr}+L_{pcc}+\lambda L_{constrat} \quad (3)$$

where $\lambda$ is a constant weight to balance reconstruction loss and representation loss.

In some embodiments, the Refining and up-sampling block 204 is shown in FIG. 2. A symmetry detection network named SymNet is applied on the reconstructed sparse but complete point cloud $\hat{S}$, to obtain a symmetry plane SP. The symmetrical points P' are obtained by applying a planner symmetry to P w.r.t. SP to enrich information from P. Point clouds are merged to $S_{merge}=\{\hat{S}, P, P'\}$. For each point in $S_{merge}$, a MLP named ResNet is used to predict an offset as a refinement. After the refinement, a point cloud $S_{mix}$ with better geometry and details is obtained. Taking $S_{mix}$ as an initial input, iterative up-sampling and de-noising are applied to get the final dense and complete point cloud while keeping fine-grained features and detailed geometry preserved. In each step of iterative up-sampling, the input point cloud $D_i$ is up-sampled to a denser point cloud $D_{i+1}$ by a predefined ratio. In some embodiments, the ratio is 1.5, 2, 3, 4, 5 or 6. Since the up-sampling process inevitably introduces noise near the shape boundary, a MLP is further used and a score is output between 0 and 1 for each point, which indicates whether the point should be dropped. During inference, when the dense and complete point cloud D is obtained after several iterative up-sampling steps to preserve the details and trustworthy points, D, input P and its symmetrical version P' are mixed as the final output.

In some embodiments of symmetry detection, since a considerable part of manmade 3D models share symmetrical characteristic, point cloud completion can benefit from symmetry. A self-supervised network called Sym-Net is developed to automatically detect symmetry. Different from some other method that takes dense voxelized volume of fine mesh model as input, the point cloud $\hat{S}$ is used as it's less memory-consuming and does not require additional complicated voxelization. Concretely, since $\hat{S}$ already has the overall shape, the planar symmetry from $\hat{S}$ is detected, and then the predicted planner symmetry is applied to the partial input P, producing additional trustworthy points P'. To be specific, for the sparse point cloud $\hat{S}$ predicted from PCC-Net, PointNet is adopted as SymNet's feature extractor to get its global representation, and 3 fully connected layers is adopted as symmetry plane predictor, which will predict a symmetry plane SP=(n, d) in the implicit form, where n=(a, b, c) is the normal direction vector of this plane, which defines a reflection plane a·x+b·y+c·z+d=0. To optimize SP to be the potential symmetry plane of $\hat{S}$, a point cloud Q is created by applying planner symmetry to $\hat{S}$ w.r.t. SP. Each point q in Q is obtained from the corresponding point p in $\hat{S}$ as:

$$q = p - 2\frac{p \cdot n + d}{\|n\|^2}n \quad (4)$$

The symmetry distance $L_{sym}$ is defined between the transformed point cloud Q and $\hat{S}$ to measure whether $\hat{S}$ is symmetrical with regard to the predicted SP:

$$L_{sym}=CD(Q,\hat{S}) \quad (5)$$

After the symmetry plane SP is available, the symmetrical points P' is obtained by applying planner symmetry to P w.r.t. SP as the same as Q to S, to enrich information from P. Note that although a lot of man-made 3D models share the symmetrical characteristic, there are still some models that are asymmetric, e.g., some lamps or sofas in ShapeNet. Therefore, an additional step is added to filter out the asymmetric models. To be specific, for those whose $L_{sym}$ is greater than or equal to $\tau$, the shape is classified as an asymmetric model, where $\tau$ is a threshold selected by prior experience.

In Shape Refinement, once a complete but sparse point cloud $\hat{S}$ is obtained from previous teacher-student network, its quality is enhanced with the help of input partial point cloud P and its symmetrical counterpart P'. The input partial point cloud P and its symmetrical point cloud P' as well as sparse but complete point cloud $\hat{S}$ are directly merged to form a denser and more reliable point cloud $S_{merge}=\{\hat{S}, P, P'\}$. For the asymmetric models, P'=P is used to make $S_{merge}$ always have the same number of points for each sample. After the merged point cloud $S_{merge}$ is available, 1 is assigned as the label for P as well as its symmetrical version P' and, 0 for $\hat{S}$. Afterwards, $S_{merge}$ is taken together with the labels as the input of the ResNet refinement module to predict a residual $\delta p=(\delta p_x, \delta p_y, \delta p_z)$ for each point $p_{merge}=(p_x, p_y, p_z)$. The obtained residual op is added to each point $p_{merge}$ in $S_{merge}$ to get a refined point cloud $S_{mix}$. For each point $p_{mix}$ in $S_{mix}$, the following is used:

$$p_{mix}=(\delta_x+\delta p_x, p_y+\delta p_y, p_z+\delta p_z) \quad (6)$$

The ResNet module is composed of a 7-layer MLPs, and the last layer with tan h as activation function is used to predict δp. The ResNet module can pull the points to its corresponding object's surface, keeping the details and improving quality. To achieve that, the mixed point cloud $S_{mix}$ is given a loss term, encouraging it to move toward ground-truth point cloud as close as possible:

$$L_{res}=CD(S_{mix},S) \quad (7)$$

In some embodiments, in de-noising, after a complete but sparse point cloud $S_{mix}$ is obtained, iterative up-sampling is performed. Initial dense point cloud $D_0$ is $S_{mix}$, and at the i-th iterative up-sampling step, the input and output point clouds are denoted as $D_i$ and $U_i'$. Since the up-sampling process inevitably introduces noise and amplifies inaccuracies from input, a de-nosing module is implemented to enhance the quality of the up-sampled point cloud $U_i'$ at each up-sampling step except the last one. A score is given to each point in the up-sampled point cloud $U_i'$ in i-th step to measure the confidence to be preserved. The scoring module is simple but effective, consisting a 3-layer shared MLP and outputs a score between 0 and 1 after the sigmoid function. $k=|U_i'|/2$ is set to get k filtered points with the highest k scores as the de-noised points $D_i$, where $|U_i'|$ is the number of points of $U_i'$. The de-noised points $D_i$ is given a penalty:

$$L'_{denoise}{}^i=CD(D_i,\tilde{D}) \quad (8)$$

where $\tilde{D}$ is the ground-truth point cloud.

In some embodiments, preserving input information is used. During inference, when the dense and complete point cloud D is obtained after several iterative up-sampling steps, to preserve the details and trustworthy points from its input partial point cloud, with the help of the symmetry detection module, the input points P, its symmetrical points P', and D are merged to get a more reliable point cloud $D_{final}$=fps({P, P', D}, $|\tilde{D}|$), where fps(X,k) means applying farthest point sampling from X to obtain k points, $|\tilde{D}|$ is the number of points in the ground-truth point cloud.

FIG. 4 is a block diagram illustrating an exemplary process 400 of recovering a complete and dense point cloud from a partial point cloud in accordance with some implementations of the present disclosure.

The process 400 of recovering a complete and dense point cloud from a partial point cloud includes a step 402 of constructing a sparse but complete point cloud from the partial point cloud through a contrastive teacher-student neural network.

The process 400 also includes a step 406 of transforming the sparse but complete point cloud to the complete and dense point cloud.

In some embodiments, the step of 402 includes a step 404 of training the student network from the ground-truth data and features learned from the teacher network so that a first feature representation of the partial point cloud of the student network is close to a second feature representation of a complete sparse point cloud of the teacher network.

In some embodiments, the step of 406 includes a step 408 of applying a symmetry detection and enrichment based on the sparse but complete point cloud to get a symmetrical point cloud from the partial point cloud.

In some embodiments, the step of 406 also includes a step 410 of refining shape of the sparse but complete point cloud to get a refined sparse but complete point cloud.

In some embodiments, the step of 406 additionally includes a step 412 of iteratively up-sampling the refined sparse but complete point cloud to get an initial complete and dense point cloud.

In some embodiments, the partial point cloud is obtained from a raw scanning.

In some embodiments, the contrastive teacher-student neural network has a dual network structure comprising a teacher network and a student network both sharing the same architecture. In some embodiments, the teacher network is a point cloud self-reconstruction network that takes a ground-truth complete sparse point cloud as input, and the student network is a point cloud completion network that takes the partial point cloud as input. In some embodiments, the teacher network and the student network are trained jointly.

In some embodiments, the difference between the first feature representation of the partial point cloud of the student network and the second feature representation of the complete sparse point cloud of the teacher network is minimized after the training.

In some embodiments, the student network has a first encoder that learns a first feature representation of the partial point cloud, and the teacher network has a second encoder that learns a second feature representation of the complete sparse point cloud, the first encoder and the second encoder sharing same network architecture of PointNet with different weights; and the student network has a first decoder that predicts the first feature representation of the partial point cloud, and the teacher network has a second decoder that predicts the second feature representation of the complete sparse point cloud. In some embodiments, the first decoder and the second decoder share the same multilayer perceptron (MLP) architecture with different weights.

In some embodiments, the step 406 of transforming the sparse but complete point cloud to the complete and dense point cloud further includes: mixing the input partial point cloud, the symmetrical point cloud and the an initial complete and dense point cloud to form the complete and dense point cloud.

In some embodiments, the step 408 of applying the symmetry detection and enrichment includes detecting a symmetry plane for the sparse but complete point cloud; and in accordance with a determination that the symmetry plane exists, applying planner symmetry for points within the partial point cloud to get the symmetrical point cloud, or in accordance with a determination that the symmetry plane does not exist, setting the symmetrical point cloud the same as the partial point cloud.

In some embodiments, the step 410 of refining the shape of the symmetrized sparse but complete point cloud includes: predicting offsets to points in the sparse but complete point cloud to match a merged point cloud from the input partial point cloud, the symmetrical point cloud, and the sparse but complete point cloud; and applying the offsets to the points in the sparse but complete point cloud to get a refined sparse but complete point cloud.

In some embodiments, the step 412 of iteratively up-sampling includes: iteratively up-sampling the refined sparse but complete point cloud by a ratio greater than 1; and de-noising an up-sampled point cloud at each up-sampling iteration except the last iteration.

In some embodiments, de-noising further includes: determining a score for each point in the up-sampled point cloud based on a comparison with a ground-truth complete point cloud, and dropping a point in the up-sampled point cloud if a respective score is exceeding a predetermined threshold.

Compared with the existing methods, the methods and systems disclosed herein can better recover the details and preserve the geometric features from the input partial point cloud. Table 1 illustrates some quantitative comparison results for point cloud completion on ShapeNet for resolution 16384 between the current contrastive point completion with fine-to-coarse refinement method and a number of other models. A state-of-the-art performance in point cloud completion with lower reconstruction error is shown in

TABLE 1

Quantitative comparison results of Chamfer Distance for point cloud completion on ShapeNet for resolution 16384.

| Model | Average Mean Chamfer Distance ($10^3$) | | | | | | | | |
|---|---|---|---|---|---|---|---|---|---|
| | Average | Airplane | Cabinet | Car | Chair | Lamp | Sofa | Table | Vessel |
| 3D-EPN | 20.147 | 13.161 | 21.803 | 20.306 | 18.813 | 25.746 | 21.089 | 21.716 | 18.543 |
| FC | 9.799 | 5.698 | 11.023 | 8.775 | 10.969 | 11.131 | 11.756 | 9.320 | 9.720 |
| Folding | 10.074 | 5.965 | 10.831 | 9.272 | 11.245 | 12.172 | 11.630 | 9.453 | 10.027 |
| PN2 | 13.999 | 10.300 | 14.735 | 12.187 | 15.775 | 17.615 | 16.183 | 11.676 | 13.521 |
| PCN-CD | 9.636 | 5.502 | 10.625 | 8.696 | 10.998 | 11.339 | 11.676 | 8.590 | 9.665 |
| PCN-EMD | 10.021 | 5.849 | 10.685 | 9.080 | 11.580 | 11.961 | 12.206 | 9.014 | 9.789 |
| TopNet | 9.890 | 6.235 | 11.628 | 9.833 | 11.498 | 9.366 | 12.347 | 9.362 | 8.851 |
| MSN* | 9.966 | 5.594 | 11.945 | 10.741 | 10.625 | 10.750 | 11.875 | 8.715 | 9.485 |
| GRNet | 9.027 | 6.407 | 10.913 | 9.634 | 9.644 | 7.968 | 10.774 | 8.769 | 8.108 |
| CRN | 8.505 | 4.794 | 9.968 | 8.311 | 9.492 | 8.940 | 10.685 | 7.805 | 8.045 |
| Current | 8.300 | 4.574 | 9.590 | 8.162 | 9.339 | 8.368 | 10.620 | 7.911 | 7.789 |

Best result is in bold and second best result is underlined.* denotes extra data is used in training.

Figure 5:
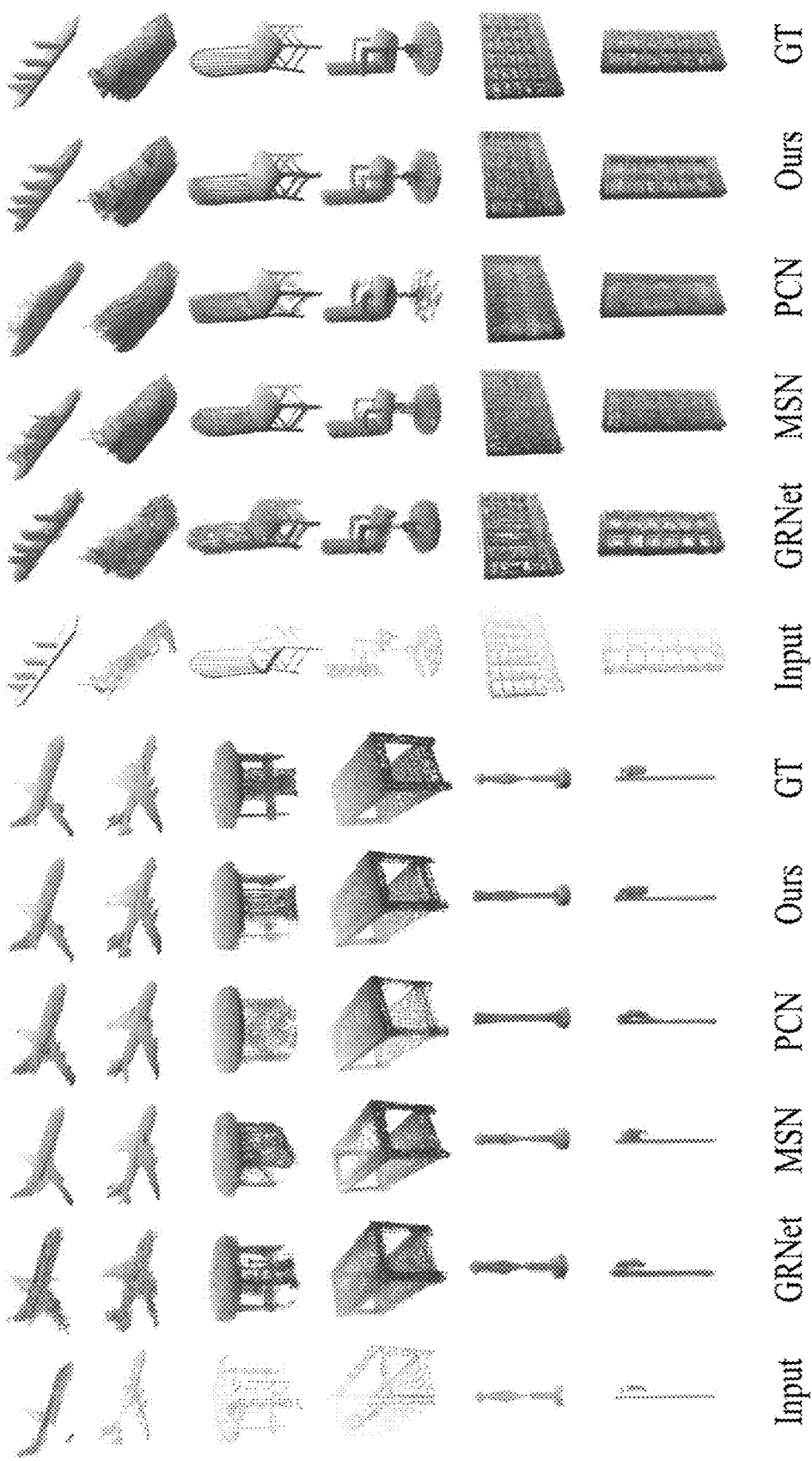
FIG. 5 illustrates some image comparison results for point cloud completion on ShapeNet between the current contrastive point completion with fine-to-coarse refinement method and a number of other models in accordance with some implementations of the present disclosure.

FIG. 5 illustrates some image comparison results for point cloud completion on ShapeNet for resolution 16384 between the current contrastive point completion with fine-to-coarse refinement method and a number of other models in accordance with some implementations of the present disclosure. In FIG. 5, each column from left to right is: input partial point cloud, results of GRNet MSN, PCN, the current method, and the ground truth. It shows that the results from the current method disclosed herein show better visual similarity compared with the ground truth point clouds where missing structures are more accurately recovered.

In some embodiments, the encode backbone both in teacher-student network and SymNet can also be replaced with other point cloud feature extraction encoder like DGCNN or PointNet++.

Further embodiments also include various subsets of the above embodiments combined or otherwise re-arranged in various other embodiments.

Herein, an image processing apparatus of the embodiments of the present application is implemented with reference to descriptions of accompanying drawings. The image processing apparatus may be implemented in various forms, for example, different types of computer devices such as a server or a terminal (for example, a desktop computer, a notebook computer, or a smartphone). A hardware structure of the image processing apparatus of the embodiments of the present application is further described below. It may be understood that FIG. 6 merely shows an exemplary structure, rather than all structures, of the image processing apparatus, and a partial or entire structure shown in FIG. 6 may be implemented according to requirements.

Figure 6:
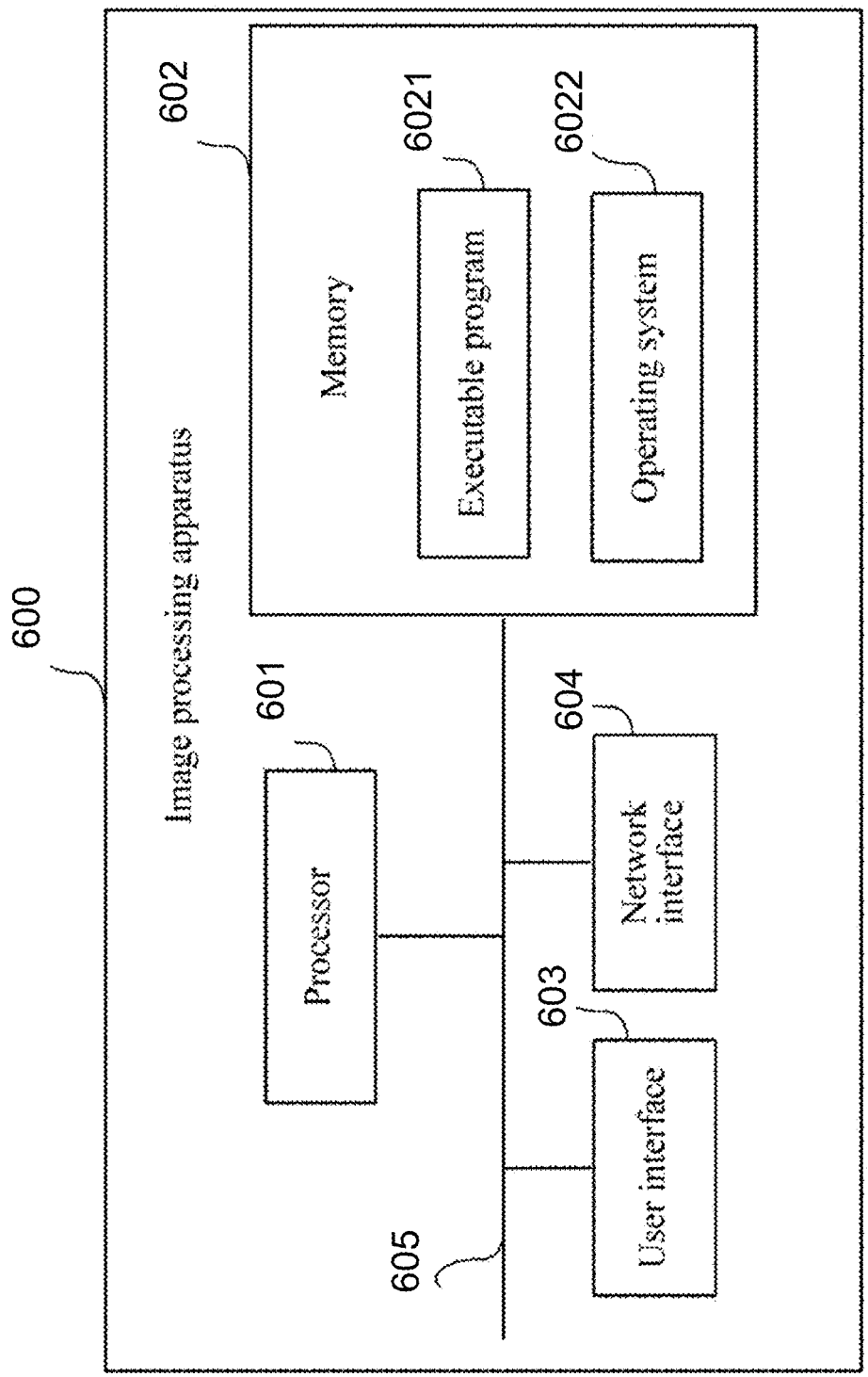
FIG. 6 is a schematic diagram of an exemplary hardware structure of an image processing apparatus in accordance with some implementations of the present disclosure.

Referring to FIG. 6, FIG. 6 is a schematic diagram of an optional hardware structure of an image processing apparatus according to an embodiment of the present application, and in an actual application, may be applied to the server or various terminals running an application program. An image processing apparatus 600 shown in FIG. 6 includes: at least one processor 601, a memory 602, a user interface 603, and at least one network interface 604. Components in the image processing apparatus 600 are coupled together by means of a bus system 605. It may be understood that the bus 605 is configured to implement connection and communication between the components. The bus system 605, besides including a data bus, may further include a power bus, a control bus, and a status signal bus. However, for a purpose of a clear explanation, all buses are marked as the bus system 605 in FIG. 6.

The user interface 603 may include a display, a keyboard, a mouse, a trackball, a click wheel, a key, a button, a touchpad, a touchscreen, or the like.

It may be understood that the memory 602 may be a volatile memory or a non-volatile memory, or may include both a volatile memory and a non-volatile memory.

The memory 602 in the embodiments of the present application is configured to store different types of data to support operations of the image processing apparatus 600. Examples of the data include: any computer program, such as an executable program 6021 and an operating system 6022, used to perform operations on the image processing apparatus 600, and a program used to perform the image processing method of the embodiments of the present application may be included in the executable program 6021.

The image processing method disclosed in the embodiments of the present application may be applied to the processor 601, or may be performed by the processor 601. The processor 601 may be an integrated circuit chip and has a signal processing capability. In an implementation process, each step of the image processing method may be completed by using an integrated logic circuit of hardware in the processor 601 or an instruction in a software form. The foregoing processor 601 may be a general-purpose processor, a digital signal processor (DSP), another programmable logic device, a discrete gate, a transistor logic device, a discrete hardware component, or the like. The processor 601 may implement or execute methods, steps, and logical block diagrams provided in the embodiments of the present application. The general purpose processor may be a microprocessor, any conventional processor, or the like. The steps in the method provided in the embodiments of the present application may be directly performed by a hardware decoding processor, or may be performed by combining hardware and software modules in a decoding processor. The software module may be located in a storage medium. The storage medium is located in the memory 602. The processor 601 reads information in the memory 602 and performs steps of the image processing method provided in the embodiments of the present application by combining the information with hardware thereof.

In some embodiments, the image processing and 3D facial and head formation can be accomplished on a group of servers or a cloud on a network.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media that is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method of recovering a complete and dense point cloud from a partial point cloud, comprising:
    constructing a sparse but complete point cloud from the partial point cloud through a contrastive teacher-student neural network; and
    transforming the sparse but complete point cloud to the complete and dense point cloud, further including:
        obtaining a symmetrical point cloud from the partial point cloud; and
        refining shape of the sparse but complete point cloud to get a refined sparse but complete point cloud, including:
            predicting offsets to points in the sparse but complete point cloud to match a merged point cloud from the partial point cloud, the symmetrical point cloud, and the sparse but complete point cloud; and
            applying the offsets to the points in the sparse but complete point cloud to get the refined sparse but complete point cloud.

2. The method according to claim 1, wherein the partial point cloud is obtained from a raw scanning.

3. The method according to claim 1, wherein the contrastive teacher-student neural network has a dual network structure comprising a teacher network and a student network both sharing same architecture, wherein
    the teacher network is a point cloud self-reconstruction network that takes a ground-truth complete sparse point cloud as input, and
    the student network is a point cloud completion network that takes the partial point cloud as input.

4. The method according to claim 3, wherein constructing the sparse but complete point cloud from the partial point cloud through the contrastive teacher-student neural network includes:
    training the student network from ground-truth data and features learned from the teacher network so that a first feature representation of the partial point cloud of the student network is close to a second feature representation of the complete sparse point cloud of the teacher network,
    wherein the teacher network and the student network are trained jointly.

5. The method according to claim 4, wherein a difference between the first feature representation of the partial point cloud of the student network and the second feature representation of the complete sparse point cloud of the teacher network is minimized after the training.

6. The method according to claim 3, wherein:
    the student network has a first encoder that learns a first feature representation of the partial point cloud, and the teacher network has a second encoder that learns a second feature representation of the complete sparse point cloud, the first encoder and the second encoder sharing same network architecture of PointNet with different weights; and
    the student network has a first decoder that predicts the first feature representation of the partial point cloud, and the teacher network has a second decoder that predicts the second feature representation of the complete sparse point cloud, the first decoder and the second decoder sharing same multilayer perceptron (MLP) architecture with different weights.

7. The method according to claim 1, wherein transforming the sparse but complete point cloud to the complete and dense point cloud further includes:
  iteratively up-sampling the refined sparse but complete point cloud to get an initial complete and dense point cloud.

8. The method according to claim 7, wherein transforming the sparse but complete point cloud to the complete and dense point cloud further includes: mixing the partial point cloud, the symmetrical point cloud and the initial complete and dense point cloud to form the complete and dense point cloud.

9. The method according to claim 7, wherein applying the symmetry detection and enrichment includes:
  detecting a symmetry plane for the sparse but complete point cloud; and
  in accordance with a determination that the symmetry plane exists, applying planar symmetry for points within the partial point cloud to get the symmetrical point cloud,
  in accordance with a determination that the symmetry plane does not exist, setting the symmetrical point cloud the same as the partial point cloud.

10. The method according to claim 1, wherein
  obtaining the symmetrical point cloud from the partial point cloud includes applying symmetry detection and enrichment based on the sparse but complete point cloud to get the symmetrical point cloud from the partial point cloud.

11. The method according to claim 7, wherein iteratively up-sampling includes:
  iteratively up-sampling the refined sparse but complete point cloud by a ratio greater than 1; and
  de-noising an up-sampled point cloud at each up-sampling iteration except last iteration.

12. The method according to claim 11, wherein de-noising further includes:
  determining a score for each point in the up-sampled point cloud based on a comparison with a ground-truth complete point cloud, and
  dropping a point in the up-sampled point cloud if a respective score is exceeding a predetermined threshold.

13. An electronic apparatus comprising one or more processing units, memory coupled to the one or more processing units, and a plurality of programs stored in the memory that, when executed by the one or more processing units, cause the electronic apparatus to perform a plurality of operations of recovering a complete and dense point cloud from a partial point cloud, comprising:
  constructing a sparse but complete point cloud from the partial point cloud through a contrastive teacher-student neural network; and
  transforming the sparse but complete point cloud to the complete and dense point cloud, further including:
    obtaining a symmetrical point cloud from the partial point cloud; and
    refining shape of the sparse but complete point cloud to get a refined sparse but complete point cloud, including:
      predicting offsets to points in the sparse but complete point cloud to match a merged point cloud from the partial point cloud, the symmetrical point cloud, and the sparse but complete point cloud; and
      applying the offsets to the points in the sparse but complete point cloud to get the refined sparse but complete point cloud.

14. The electronic apparatus according to claim 13, wherein the contrastive teacher-student neural network has a dual network structure comprising a teacher network and a student network both sharing same architecture, wherein
  the teacher network is a point cloud self-reconstruction network that takes a ground-truth complete sparse point cloud as input, and
  the student network is a point cloud completion network that takes the partial point cloud as input.

15. The electronic apparatus according to claim 14, wherein constructing the sparse but complete point cloud from the partial point cloud through the contrastive teacher-student neural network includes:
  training the student network from ground-truth data and features learned from the teacher network so that a first feature representation of the partial point cloud of the student network is close to a second feature representation of the complete sparse point cloud of the teacher network,
  wherein the teacher network and the student network are trained jointly.

16. The electronic apparatus according to claim 15, wherein a difference between the first feature representation of the partial point cloud of the student network and the second feature representation of the complete sparse point cloud of the teacher network is minimized after the training.

17. The electronic apparatus according to claim 13, wherein transforming the sparse but complete point cloud to the complete and dense point cloud further includes:
  iteratively up-sampling the refined sparse but complete point cloud to get an initial complete and dense point cloud;
  wherein obtaining the symmetrical point cloud from the partial point cloud includes applying symmetry detection and enrichment based on the sparse but complete point cloud to get the symmetrical point cloud from the partial point cloud.

18. The electronic apparatus according to claim 17, wherein transforming the sparse but complete point cloud to the complete and dense point cloud further includes: mixing the partial point cloud, the symmetrical point cloud and the initial complete and dense point cloud to form the complete and dense point cloud.

19. A non-transitory computer readable storage medium storing a plurality of programs for execution by an electronic apparatus having one or more processing units, wherein the plurality of programs, when executed by the one or more processing units, cause the electronic apparatus to perform a plurality of operations of recovering a complete and dense point cloud from a partial point cloud, comprising:
  constructing a sparse but complete point cloud from the partial point cloud through a contrastive teacher-student neural network; and
  transforming the sparse but complete point cloud to the complete and dense point cloud, further including:
    obtaining a symmetrical point cloud from the partial point cloud; and
    refining shape of the sparse but complete point cloud to get a refined sparse but complete point cloud, including:
      predicting offsets to points in the sparse but complete point cloud to match a merged point cloud from the partial point cloud, the symmetrical point cloud, and the sparse but complete point cloud; and applying the offsets to the points in the sparse but complete point cloud to get the refined sparse but complete point cloud.

20. The non-transitory computer readable storage medium according to claim 19, wherein the contrastive teacher-student neural network has a dual network structure comprising a teacher network and a student network both sharing same architecture, wherein the teacher network is a point cloud self-reconstruction network that takes a ground-truth complete sparse point cloud as input, and the student network is a point cloud completion network that takes the partial point cloud as input.

* * * * *